E. S. JOHNSON.
SPRING TIRE.
APPLICATION FILED FEB. 18, 1919.

1,340,272. Patented May 18, 1920.

INVENTOR:
Evans S. Johnson.
BY
ATTORNEYS

UNITED STATES PATENT OFFICE.

EVANS S. JOHNSON, OF ELDORADO, OKLAHOMA.

SPRING-TIRE.

1,340,272.  Specification of Letters Patent.  Patented May 18, 1920.

Application filed February 18, 1919. Serial No. 277,700.

*To all whom it may concern:*

Be it known that I, EVANS S. JOHNSON, a citizen of the United States, residing at Eldorado, in the county of Jackson, State of Oklahoma, have invented certain new and useful Improvements in Spring-Tires; and I do hereby declare the following to be a full, clear, and exact description of the invention, such as will enable others skilled in the art to which it appertains to make and use the same.

This invention relates to tires and more particularly to spring tires, and has for its object to provide a tire of this kind which, while being efficient in operation, will be so constructed that its component parts may be readily assembled; and in which springs employed to give resilience to the structure may be readily disengaged from the parts with which they are associated, should replacements be necessary.

Another object is to provide a tire of this kind including a shock absorbing element.

Other objects will be seen from the following description.

Figure 1:
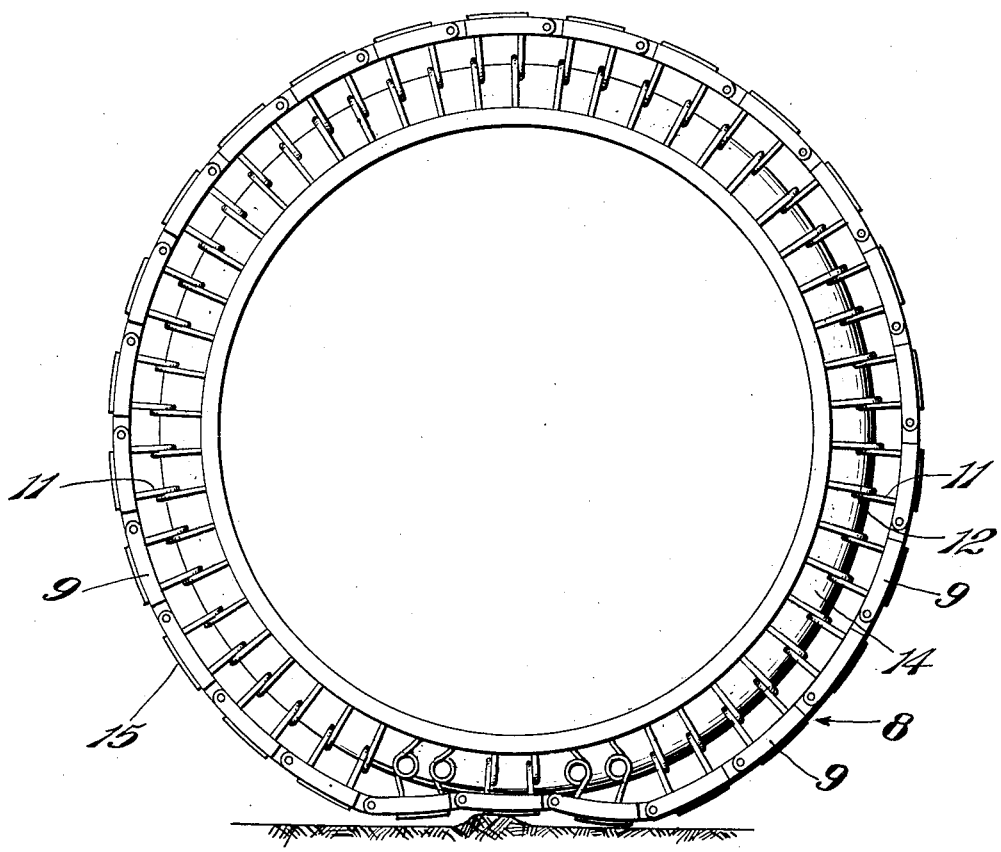
Figure 1 is a side elevation of the present tire, complete.
Figure 2:
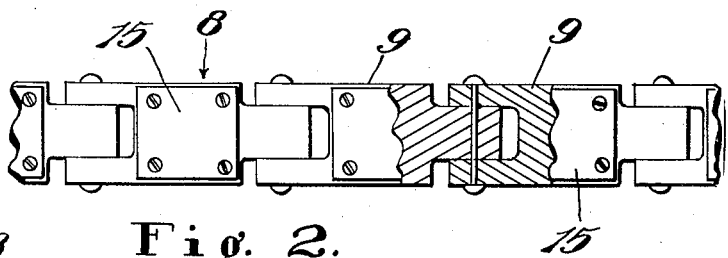
Fig. 2 is a plan showing a part of the sectional tread band, partly in section.
Figure 3:
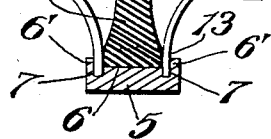
Fig. 3 is a transverse section through the tire in the plane of one of the pairs of springs, the latter being shown in elevation.

Referring now to the drawings, the present tire includes a rim 5, peripherally channeled as shown at 6, and provided with circumferentially spaced pairs of sockets 7 inwardly of and adjacent to the walls 6' of the channel 6.

This rim 5 may be engaged with the felly of a vehicle wheel and held thereon by the usual lugs employed with demountable rims, or it may be secured to the felly in any other suitable way. The method of attaching the rim to the felly forms no part of this invention, and hence it is not illustrated in the drawings.

Employed in connection with the rim 5, there is a sectional tread band 8, the sections 9 of which are hinged together at their ends to form a circle. Each section 9 is but slightly longer than the space between two adjacent pairs of sockets 7, and formed in the inner face of each section, there are two spaced pairs of sockets 10, so located that when the tread band is disposed about the rim 5 concentrically therewith, the sockets 10 will aline with the sockets 7 radially of the rim and tread band.

When thus positioned, the sockets are disposed to receive the ends of spring members 11 which are engaged between the rim and tread band, these two elements being of such relative sizes that the rim lies spaced from the tread band when the latter is disposed thereabout.

Each spring member 11 consists, in the form illustrated in the drawings, of a bar of resilient metal, bent to form a helix 12 at its center, and having oppositely extending end portions 13, the extremities of these portions 13 being engaged in alining pairs of sockets 7 and 10.

As shown, the space between the rim and tread band is such that when the members are disposed therebetween, the end portions 13 thereof at each side of the helices 12, converge slightly in a direction away from the helices, the helices 12 being thus tensioned, whereby the extremities of the members 11 are held in the sockets in which they are engaged. As shown in the drawings, the several members 11 are so disposed that the sides of their helices from which spring the end portions 13 are directed outwardly at the sides of the tire, so that the helices of opposed members 11 extend toward each other, transversely of the tire.

By virtue of the structure described in the foregoing, it is possible to assemble the tire by disposing the tread band about the rim and then springing the members 11 into position therebetween, it being also possible readily to remove any one of the members 11, as will be apparent.

As will be readily understood, the members 11 serve to hold the tread band yieldably spaced from the rim, the several sections 9 of the band being movable toward the rim against the action of the members 11 under pressure exerted against their outer faces. The provision of the sectional tread band permits this band to conform to slight inequalities in the surface over which the tire may be traveling—as, for example, a small pebble on a road surface—as illustrated in Fig. 1, the section 9 which engages the pebble being moved toward the rim, while the adjacent sections assume a diagonal position with respect to the rim, as shown.

The mounting of the ends of the members 11 in the sockets 7 and 10 especially facilitates the just described action of the band sections 9. As illustrated, the ends of the members 11 are free to move pivotally in the sockets, and thus they will shift to the positions illustrated in Fig. 1 when certain of the sections assume diagonal positions. Without provision for this shifting, there would be lateral distortion of the helices of these particular members 11, with possible permanent bending thereof.

In the complete tire, there is employed a shock absorbing element which consists of a circular body of rubber or other suitable resilient cushioning material, which is engaged about the rim 5, lying in the channel 6 thereof, between the members 11 transversely of the rim. This shock absorbing element is indicated at 14, and receives the tread band thereagainst as the latter is moved toward the rim, to yieldingly limit such movement.

Secured to the outer face of each of the band sections 9, there is a tread facing of rubber or other suitable material 15, as illustrated.

What is claimed is:

A tire including a rim and a tread band spaced therefrom, said rim and band having each two series of sockets spaced apart axially of the band and arranged with the sockets in pairs and two series of helices between the rim and band having oppositely extending end portions engaged in corresponding opposite sockets of the rim and band, with the axes of each series of helices in a common plane at right angles to the axis of the band.

In testimony whereof I affix my signature in the presence of two witnesses.

EVANS S. JOHNSON.

Witnesses:
HENRY C. MOORE,
TOM KINNIE.